United States Patent Office 2,961,455
Patented Nov. 22, 1960

2,961,455
ADDUCTS OF ORGANIC PHOSPHORUS COMPOUNDS AND PROCESS FOR PRODUCING SAME

Gail H. Birum and James L. Dever, Dayton, Ohio, assignors to Monsanto Chemical Company, St. Louis, Mo., a corporation of Delaware No Drawing. Filed Sept. 26, 1958, Ser. No. 763,445

19 Claims. (Cl. 260—461)

This invention relates to organic phosphorus compounds and the method of preparing the same. More particularly the invention provides new and valuable products prepared by the addition reaction of certain dicarbonylic compounds with certain esters of trivalent phosphorus acids.

It is known that monocarbonylic compounds react with phosphite diesters to give hydroxyphosphonates, e.g., as reported in the Fields Patent No. 2,579,810, and that p-benzoquinone reacts with a dialkyl phosphite to give hydroquinone phosphonates as disclosed in the Ladd et al. Patent No. 2,553,417. In both instances, the reaction proceeded by addition of the hydrogen atom of the dialkyl phosphite $(RO)_2POH$ to the carbonyl oxygen and consequent formation of a hydroxy compound. While the phosphite triesters have been reported in prior art to react with carbonylic compounds, the latter were always halogenated aldehydes and ketones; and there was involved a condensation reaction rather than an addition reaction whereby an alkyl halide was formed as the by-product. Thus, Pudovik et al., J. Gen. Chem. USSR, 26, 2503 (1956) report the reaction of chloroacetylacetone $$CH_3COCHClCOCH_3$$

to condense with triethyl phosphite with formation of the unsaturated, halogen-free ketonic phosphate $$CH_3COCH{:}C(CH_3)OP(O)(OC_2H_5)_2$$

Inasmuch as the chlorine atom of the ketonic reactant and one of the ethyl radicals of the phosphite reactant are not present in the Pudovik et al. products, the reaction of triesters with the halogenated carbonyl compounds does not at all proceed as does that of the phosphite diesters and the halogen-free carbonylic compounds.

Now we have made the surprising discovery that phosphite triesters, as well as other trivalent phosphorus compounds which lack the available hydrogen of the dialkyl phosphites, react with carbonylic compounds by an addition reaction to give 1:1 adducts when the carbonylic compound is either an α-diketone or an α-keto-aldehyde consisting only of the elements, C, H and O and being free of olefinic and acetylenic unsaturation.

The presently useful trivalent phosphorus compounds have the formula

where R is selected from the class consisting of hydrocarbyl and halohydrocarbyl radicals which are free of acetylenic and olefinic unsaturation and have from 1 to 12 carbon atoms, Y is selected from the class consisting of R and —OR and wherein —OR and Y taken together stand for the bivalent —O-alkylene-O— radical of from 2 to 5 carbon atoms, and X is selected from the class consisting of R, —OR, —SR, dialkylamino radicals having from 1 to 5 carbon atoms in each alkyl group and alkyleneimino radicals of from 2 to 5 carbon atoms.

α-Dicarbonylic compounds which form 1:1 adducts with the above trivalent phosphorus compounds have the formula

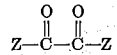

in which Z is selected from the class consisting of hydrocarbyl radicals which are free of olefinic and acetylenic unsaturation and have from 1 to 12 carbon atoms and the said hydrocarbyl radicals having a substituent selected from the class consisting of alkoxy groups of from 1 to 5 carbon atoms and the methylenedioxy —O—$CH_2$—O— group. We believe that the adducts very likely have the cyclic structure:

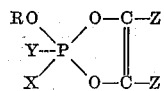

However, since this is a new type of structure and basic chemical and physical measurements are not yet available for undisputable proof of this structure, we prefer not to limit our claims to this specific structure, and prefer to characterize our new compounds only as the 1:1 adducts of the two reactants.

Thus, the presently provided adducts can be characterized with certainty only by the formula

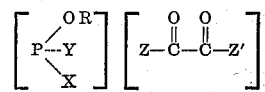

Analytical studies of the products show that they are 1:1 adducts because the empirical formula of the adducts equals the sum of the empirical formulas of the dicarbonylic and trivalent phosphorus compound reactants.

A very valuable class of dicarbonylic compounds which are useful for the preparation of the presently provided adducts includes the α-alkanediones of from 4 to 26 carbon atoms and the alkoxy derivatives thereof, e.g., 2,3-butanedione
2,3-pentanedione
4-methyl-2,3-pentanedione
3,4-hexanedione
2,2,5,5-tetramethyl-3,4-hexanedione
2,3-hexanedione
5-methyl-2,3-hexanedione
4,5-octanedione
2,3-octanedione
2,7-dimethyl-4,5-octanedione
3,4-heptanedione
5,6-decanedione
3,4-decanedione
5,6-dodecanedione
10,11-eicosanedione
1,2-cyclohexanedione
1,2-cyclopentanedione
13,14-hexacosanedione
4-methyl-2,3-decanedione
2,3-undecanedione
2-methyl-6,7-octanedione
3,4-nonanedione
2,5-dimethyl-3,4-hexanedione
2-methyl-5,6-heptanedione
1-methoxy-2-methyl-3,4-hexanedione
5-ethoxy-2,3-pentanedione
11,12-tetracosanedione Another valuable class of dicarbonylic compounds which, according to the invention, form 1:1 adducts with the presently disclosed trivalent phosphorus compounds are the aryl- or cycloalkyl-substituted α-alkanediones and the alkoxy derivatives thereof, e.g., 1-phenyl-1,2-pentanedione
3,3-dimethyl-1-phenyl-1,2-butanedione
1-phenyl-1,2-propanedione
1,3,3-triphenyl-1,2-propanedione
1,3-diphenyl-1,2-butanedione
1,4-diphenyl-1,2-butanedione
3-methyl-1-phenyl-1,2-butanedione
1-phenyl-1,2-butanedione
1,4-diphenyl-2,3-butanedione
3,3-dimethyl-(2,4-xylyl)-1,2-butanedione
1-mesityl-3,3-dimethyl-1,2-butanedione
3-cyclohexyl-1-phenyl-1,2-propanedione
1-(m-methoxyphenyl)-3,4-hexanedione
1-(β-naphthyl)-8,9-hexadecanedione
1-(2,4-dimethoxyphenyl)-3-phenyl-1,2-propanedione Still another class of presently useful α-dicarbonylic compounds includes benzil and the binaphthoyls and their hydrocarbon or ether derivatives, e.g., o-, m- or p-tolil; o-, m- or p-anisil; veratril (3,3',4,4'-tetramethoxybenzil); 2,2'-diethoxybenzil; 2,2',4,4',5,5'-hexaethylbenzil; 2'-methoxy-2,4,6-trimethylbenzil; piperil, etc.

As hereinbefore disclosed, the dicarbonylic compound may also be an α-ketoaldehyde, i.e., a glyoxal derivative of the formula

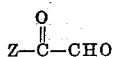

wherein Z is as defined above. Examples of α,β-ketoaldehydes which have the above formula and which react with the trivalent phosphorus acid esters or amides to give the present 1:1 adducts are:

Pyruvaldehyde
2-oxobutyraldehyde
4-methyl-2-oxobutyraldehyde
Phenylglyoxal
Cyclohexaneglyoxylaldehyde
p-Methoxyphenylglyoxal
Naphthaleneglyoxylaldehyde
Cyclopentaneglyoxylaldehyde An especially useful class of trivalent phosphorus compounds which adds to the α-dicarbonylic compounds to give the present adducts comprises the phosphite triesters of the formula $P(OR)_3$ where R is a hydrocarbon or a halohydrocarbon radical which is free of olefinic and acetylenic unsaturation and contains from 1 to 12 carbon atoms. Examples of such triesters are:

Trimethyl phosphite
Triethyl phosphite
Tris(2-chloroethyl) phosphite
Triisopropyl phosphite
Tris(3,4-dichlorobutyl) phosphite
Tri-n-amyl phosphite
Tri-n-hexyl phosphite
Tris(2-ethylhexyl) phosphite
Tridodecyl phosphite
3-bromopropyl diethyl phosphite
Dimethyl ethyl phosphite
Butyl diethyl phosphite
Amyl-di-n-octyl phosphite
Ethyl methyl propyl phosphite
Butyl 2-iodoethyl phenyl phosphite
Triphenyl phosphite
Tris(4-chlorophenyl) phosphite
Tri-p-tolyl phosphite
Tris(o-ethylphenyl) phosphite
Tribenzyl phosphite
Dimethyl pentachlorophenyl phosphite
Trinaphthyl phosphite
Dibutyl phenyl phosphite
Di-p-tolyl 2-fluoroethyl phosphite
Tricyclohexyl phosphite
Tribiphenylyl phosphite
Tris(4-methylcyclohexyl) phosphite
Amyl cyclopentyl phenyl phosphite Triesters of phosphorothious acid also react with the α-dicarbonyl compounds according to the invention. Such esters have the formula $$(RO)_2PSR$$

wherein R is as defined above. Examples thereof are:

Diethyl S-ethyl phosphorothioite
Diphenyl S-phenyl phosphorothioite
Butyl 2-ethylhexyl S-propyl phosphorothioite
Diphenyl S-amyl phosphorothioite
Bis(3-iodopropyl) S-α-naphthyl phosphorothioite
Di-n-butyl S-cyclohexyl phosphorothioite
Di-p-tolyl S-propyl phosphorothioite
Dibenzyl S-benzyl phosphorothioite
Bis(p-butylphenyl) S-ethylphosphorothioite Also useful for the preparation of the present adducts are the cyclic esters of phosphorous acid, i.e., compounds of the formula

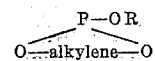

wherein R is as defined above and alkylene denotes a bivalent alkylene radical of from 2 to 5 carbon atoms. Examples of such cyclic esters are, e.g., phenyl ethylene phosphite, ethyl propylene phosphite, 2-chloroethyl ethylene phosphite, cyclohexyl butylene phosphite, dodecyl dimethylpropylene phosphite, and β-naphthyl ethylene phosphite. The presently useful cyclic ester may likewise be a phosphorothioite, e.g., S-phenyl ethylene phosphorothioite or S-methyl butylene phosphorothioite.

Diesters of phosphoramidous acid which form adducts with α-dicarbonyl compounds have the formula

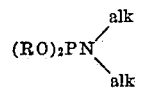

or

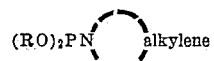

wherein R is the hydrocarbon radical or halohydrocarbon radical defined above, alk denotes an alkyl radical of from 1 to 5 carbon atoms and the designated alkylene radical has from 2 to 5 carbon atoms. Such esters, for example, are: diethyl N,N-dimethyl phosphoramidite; diphenyl N,N-dibutyl phosphoramidite; bis(2-fluoroethyl) N-ethyl N-propyl phosphoramidite; amyl butyl N,N-dipropyl phosphoramidite; diethyl N-ethylene phosphoramidite; and 4-chlorophenyl cyclohexyl N-butylene phosphoramidite. The phosphoramidites may likewise be cyclic esters, e.g., the ethylene glycol ester of N,N-dimethyl phosphoramidous acid or the isopropylene glycol ester of N-ethylene phosphoramidous acid.

Esters of phosphonous acids are likewise useful in the preparation of adducts with α-carbonyl compounds. Such esters have the formula

wherein R is the hydrocarbon or halohydrocarbon radical herein defined and X is selected from the class consisting of —OR, —SR, a dialkylamino radical having from 1 to 5 carbon atoms in each alkyl group, and an alkyleneimino radical of from 2 to 5 carbon atoms, and wherein X and OR taken together stand for the —O-alkylene-O— radical of from 2 to 5 carbon atoms. The compounds are thus phosphonites, phosphonothioites or phosphonamidites, e.g., diphenyl phenylphosphonite; diethyl butylphosphonite; 2-chloroethyl 2-ethylhexyl β-naphthylphosphonite; methyl S-methyl p-tolylphosphonothioite; 2-ethylhexyl S-phenyl dodecylphosphonothioite; ethyl N,N-dimethyl ethylphosphonamidite; butyl N-ethylene phenylphosphonamidite; cyclopentyl S-amylphenyl ethylphosphonothioite, or the alkylene glycol cyclic ester of a hydrocarbon phosphonic acid such as the ethylene glycol ester of butylphosphonous acid, cyclohexylphosphonous acid or phenylphosphonous acid.

Esters of phosphinous acid, likewise, form adducts with the α-diketones. Examples of useful phosphinites include methyl dimethylphosphinite, p-tolyl diphenylphosphinite, amyl (butyl)-ethylphosphinite, benzyl diethylphosphinite, cyclohexyl diphenylphosphinite, 4-ethylphenyl di-n-octylphosphinite, dodecyl didodecylphosphinite, etc.

Reaction of the above-described dicarbonyl compounds and the trivalent phosphorus esters is effected by simply mixing the two reactants at ordinary, decreased or increased temperature and allowing the resulting reaction mixture to stand until formation of the 1:1 adduct of the two components. Generally, the reaction is moderately exothermic; hence, no external heating need be customarily employed. This is particularly true when the carbonyl compound is a low-molecular weight diketone, and the phosphorus compound is a lower trialkyl phosphite. With such reactants, application of cooling is usually advantageous in order to obtain smooth reaction. When working with such active α-diketones and/or phosphites, optimum conditions comprise gradual addition of the diketone to the phosphite with application of external cooling and thorough stirring. Operation in an inert atmosphere, e.g., nitrogen, is advantageous. Since the adducts are somewhat susceptible to water, for good yields of product it is also advantageous to operate in the substantial absence of moisture. Usually it suffices to maintain the reaction temperature at, say, from 5° C. to 50° C. during addition of the diketone or ketoaldehyde. When all of the carbonylic compound has been added to the trivalent phosphorus compound and there is no longer any evidence of exothermic reaction, completion of the reaction may be assured by heating the reaction mixture to a temperature of from, say, 50° C. to 100° C. With the more sluggish carbonylic compounds, e.g., the high-molecular weight aliphatic diketones, it may be necessary to heat the reaction mixture moderately, say, to a temperature of about 50° C., before an exothermic reaction is initiated. Since reactivity of the various dicarbonylic compounds and of the various trivalent phosphorus esters is thus known to vary, it is recommended that in each initial run the keto compound and the phosphorus compound be mixed gradually at low temperatures and that external heating be employed only when there appears to be no spontaneous increase in temperature as a consequence of the mixing. Reaction of the carbonylic compound with the trivalent phosphorus ester takes place readily in the absence of an inert diluent or catalyst. The use of diluents may be particularly advantageous when working with the more reactive diketones or keto aldehydes; such diluents may be, e.g., benzene, toluene, dioxane, methylene chloride, or hexane. When employing no diluent and using substantially the stoichiometric proportion of reactants, i.e., one molar equivalent of the phosphorus ester and one molar equivalent of the carbonylic compound, the reaction product may be used directly for a variety of industrial and agricultural purposes without purification, i.e., it consists essentially of the 1:1 adduct. When an excess of either the dicarbonylic compound or the trivalent phosphorus ester is employed, said excess can be readily recovered from the reaction product, e.g., by distillation. In order to assure complete participation of the generally less readily available dicarbonylic compound, an excess of the latter may be advantageously employed.

The presently provided 1:1 adducts of α-dicarbonylic compounds and the above-disclosed trivalent phosphorus esters are generally high-boiling liquid products having insecticidal properties and other biological toxicant properties. The present adducts are also useful as intermediates for the preparation of a new and valuable class of β-oxo phosphates, phosphonates and phosphinates. As disclosed in our copending application, Serial No. 765,696, filed of even date, the diketone adducts react readily with a hydrogen donor, such as water, substantially according to the following scheme:

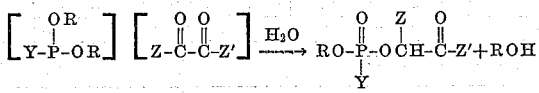

in which R is selected from the class consisting of hydrocarbyl and halohydrocarbyl radicals free of olefinic and acetylenic unsaturation, Y is selected from the class consisting of R and OR and Z is selected from the class consisting of hydrocarbyl radicals free of olefinic and acetylenic unsaturation and containing from 1 to 12 carbon atoms.

Conversion of the adducts to the oxo compounds is effected, e.g., by simply adding water or an acid to the adduct and allowing the resulting mixture to stand. Generally, there is a short induction period followed by an exothermic reaction. Thus, the conversion of the 1:1 triethyl phosphite-2,3-butanedione adduct to diethyl 1-methyl-2-oxopropyl phosphate proceeds readily according to the scheme:

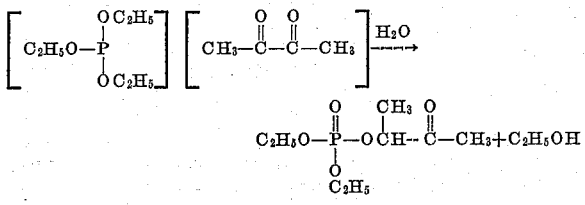

The above reaction has been effected, e.g., as follows: Water (5.0 g., 0.28 mole) was added to 63.1 g. (0.25 mole) of the adduct. After a short induction period, the temperature of the reaction mixture gradually increased spontaneously to 70° C. After cessation in temperature rise, the reaction mixture was distilled to give first, the by-product ethanol, and then the diethyl 1-methyl-2-oxopropyl phosphate, B.P. 87–90° C./0.15–0.20 mm., analyzing 42.92% C, 7.83% H and 13.83% P as against 42.88%, 7.63% and 13.81%, the respective calculated values.

The presently provided 1:1 adducts are also very readily oxidized. They react readily with oxygen or an oxygen-containing gas, including air, to yield phosphorus esters and the regenerated diketone reactant according to the scheme:

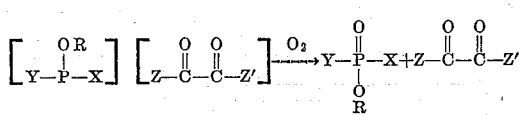

Thus, as shown in Example 25, passage of oxygen into the 1:1 triethyl phosphite-2,3-butanedione adduct until there is no longer evidence of an exothermic reaction and distillation of the resulting reaction mixture gives triethyl phosphate and 2,3-butanedione in substantially quantitative yields. The easy oxidizability of the present adducts thus affords a new and very expedient method for the conversion of the trivalent phosphorus esters into the corresponding pentavalent phosphorus esters, as shown in Example 26.

The present invention is illustrated, but not limited, by the following examples:

*Example 1*

To 74.4 g. (0.598 mole) of ice-cooled trimethyl phosphite, there was added, dropwise during 30 minutes, 51.5 g. (0.598 mole) of 2,3-butanedione. During addition of the dione, the reaction mixture remained below 10° C. When all of the dione had been added, ice-cooling was discontinued and the temperature rose to 26° C.

Addition of 5 ml. of the trimethyl phosphite at this point appeared to have no appreciable effect on the temperature. The mixture was heated to 65° C., cooled, placed under water-pump vacuum and heated to 68° C. in order to remove the excess of phosphite. Distillation of the residue gave 119.5 g. (94.9% theoretical yield) of the clear, colorless 1:1 trimethyl phosphite-2,3-butanedione adduct, B.P. 54–58° C./0.2 mm., $n_D^{25}$ 1.4383, which analyzed as follows:

|  | Found | Calcd. for $C_7H_{15}O_5P$ |
|---|---|---|
| Percent C | 39.79 | 39.92 |
| Percent H | 7.06 | 7.19 |
| Percent P | 14.53 | 14.71 |

*Example 2*

To a cooled solution consisting of 96.1 g. (0.457 mole) of benzil dissolved in about 200 ml. of methylene dichloride, there was added, dropwise during 15 minutes, 56.9 g. (0.457 mole) of trimethyl phosphite. During the addition of the phosphite, the reaction mixture was maintained at about 10–20° C. After all of the phosphite had been added, extraneous cooling was discontinued and about a 5% excess of trimethyl phosphite was added to insure complete reaction. After stirring the whole for 12 minutes at room temperature (25° C.), the mixture was heated at reflux for one hour. It was then placed under water-pump vacuum and heated to 75° C. in order to remove the solvent and the excess of phosphite. Concentration to 100° C./0.6 mm. gave as residue the substantially pure 1:1 trimethyl phosphite-benzil adduct which solidified upon standing overnight.

*Example 3*

2,3-butanedione (51.7 g., 0.60 mole) was added, at a temperature of minus 1° C. to 10° C. during 12 minutes, to 99.7 g. (0.6 mole) of triethyl phosphite. When all of the dione had been added, stirring was continued in the ice-brine bath for 10 minutes and then for another 12 minutes at room temperature. The whole was then heated to 65° C. in order to insure complete reaction, cooled, and placed under water-pump vacuum and heated to 65° C. in order to remove any unreacted starting materials. Distillation of the residue gave 136.9 g. (90.4% theoretical yield) of the substantially pure, colorless 1:1 triethyl phosphite-2,3-butanedione adduct, B.P. 56–57° C./0.2 mm., $n_D^{25}$ 1.4326, and analyzing as follows:

|  | Found | Calcd. for $C_{10}H_{21}O_5P$ |
|---|---|---|
| Percent C | 47.38 | 47.52 |
| Percent H | 8.54 | 8.36 |
| Percent P | 12.40 | 12.29 |

*Example 4*

To 120.6 g. (0.36 mole) of trihexyl phosphite, cooled to 5° C., there was added, during 10 minutes 31.0 g. (0.36 mole) of 2,3-butanedione. The whole was then allowed to attain room temperature, stirred for 12 minutes, and then heated to 107° C. in order to insure complete reaction. Removal of any excess of the dione was effected by placing the resulting mixture under water-pump vacuum and heated to 65° C. The residue comprised the substantially pure 1:1 trihexyl phosphite-2,3-butanedione adduct, $n_D^{25}$ 1.4449, analyzing 61.52% carbon, as against 62.87%, the calculated value for $C_{22}H_{45}O_5P$.

*Example 5*

2,3-butanedione (38.8 g., 0.45 mole) was added during 15 minutes to 121.1 g. (0.45 mole) of tris(2-chloroethyl) phosphite at a temperature of 4–35° C. During the addition, extraneous cooling was employed, and after all of the dione had been added, the whole was stirred, with cooling, at 35° C. until no further evidence of exothermic reaction. The whole was then heated to 95° C., cooled to 50° C., placed under water-pump vacuum and heated to 80° C. in order to remove any unreacted 2,3-butanedione. Concentration of the residue to 100° C./0.25 mm., gave 156 g. (97.6% theoretical yield) of the substantially pure 1:1 tris(2-chloroethyl) phosphite-2,3-butanedione adduct, $n_D^{25}$ 1.4818, and analyzed as follows:

|  | Found | Calcd. for $C_{10}H_{18}O_5Cl_3P$ |
|---|---|---|
| Percent C | 32.71 | 33.82 |
| Percent H | 5.35 | 5.11 |
| Percent Cl | 29.24 | 29.98 |

*Example 6*

To 102.3 g. (0.33 mole) of triphenyl phosphite there was added, during about 10 minutes, 43.1 g. (0.5 mole) of 2,3-butanedione. The whole was then stirred at room temperature for 0.5 hour. It was then heated for 1.75 hours at 88° C., cooled to 70° C., placed under water-pump vacuum and heated to 100° C. in order to remove the excess dione. It was then concentrated to 100° C./2.5 mm. A total of 14.6 g. of the dione was recovered during both evacuations. Since the excess of 2,3 butanedione which was actually employed was 14.7 g., the reaction apparently went to completion. There was thus obtained as residue 131.3 g. (100% theoretical yield) of the substantially pure 1:1 triphenyl phosphite-2,3-butanedione adduct, $n_D^{25}$ 1.5628.

*Example 7*

To a cooled (5° C.) solution consisting of 84.2 g. (0.4 mole) of benzil in about 200 ml. of methylene dichloride, there was added during 12 minutes, 66.7 g. (0.4 mole) of triethyl phosphite. The reaction mixture was maintained at below 15° C. during addition of the phosphite. When all of the phosphite had been added, ice-cooling was discontinued and the reaction mixture allowed to attain room temperature. It was then refluxed for 12 minutes to insure complete reaction, subjected to water-pump vacuum and warmed to a maximum temperature of 33° C. in order to remove the solvent. Concentration to 95° C./0.9 mm., gave as residue 150.8 g. (100% theoretical yield) of the substantially pure 1:1 triethyl phosphite-benzil adduct, $n_D^{25}$ 1.5604.

*Example 8*

Tris(2-chloroethyl) phosphite (86.2 g., 0.32 mole) was added, during 20 minutes, to a cooled (5° C.) solution of 67.5 g. (0.32 mole) of benzil in about 175 ml. of methylene dichloride. Ice-cooling kept the temperature of the reaction mixture below 12° C. during the addition. After all of the phosphite had been added, extraneous cooling was discontinued and the mixture was heated at reflux (45° C.) for 12 minutes to insure complete reaction. The solvent was removed by heating to 60° C. under waterpump vacuum, and concentration of the residue to 90° C./0.7 mm., gave 151 g. (98.2% theoretical yield) of the substantially pure 1:1 tris(2-chloroethyl) phosphite-benzil adduct, $n_D^{25}$ 1.5769, analyzing 49.51% carbon and 5.19% hydrogen as against 50.17% and 4.61%, the calculated values for $C_{20}H_{22}O_5Cl_3P$.

*Example 9*

To 29.3 g. (0.176 mole) of triethyl phosphite, there was added, during 15 minutes, 25 g. (0.176 mole) of 2,3-octanedione. Occasional cooling was applied to keep the temperature between 20–30° C. throughout the addition. The whole was then stirred at room temperature for about 10 minutes, heated to 65° C. in order to insure complete reaction, cooled to 50° C. and heated under water-pump vacuum to 65° C. in order to remove any unreacted starting material. Distillation of the residue gave 36.0 g. (66.4% theoretical yield) of the substantially pure 1:1 triethyl phosphite-2,3-octanedione adduct, B.P. 96.5° C./0.25 mm. The rather low yield of adduct may be ascribed to the use of an impure grade of dione.

Example 10

2,3-butanedione (140.2 g., 1.61 moles) was added, dropwise during one hour, to 416.5 g. (2.0 moles) of triisopropyl phosphite which had been cooled to 7° C. Extraneous cooling was employed during the addition. When all of the dione had been added, the whole was stirred at room temperature for 15 minutes and then heated to 80° C. in order to insure complete reaction. Distillation of the resulting product gave 414.9 g. of the substantially pure 1:1 trisisopropyl phosphite-2,3-butanedione adduct, B.P. 49–61° C./0.2 mm. Refractionation gave 313.4 g. of a purer product, B.P. 59–61° C./0.2 mm., $n_D^{25}$ 1.4249, which analyzed as follows:

|  | Found | Calcd. for $C_{13}H_{27}O_5P$ |
| --- | --- | --- |
| Percent C | 53.05 | 53.02 |
| Percent H | 9.15 | 9.24 |
| Percent P | 10.33 | 10.52 |

Example 11

To 87.1 g. (0.87 mole) of ice-cooled 2,3-butanedione, there was added, during 45 minutes at below 10° C., 145.0 g. (0.87 mole) of triethyl phosphite. When addition of the phosphite had been completed, cooling was discontinued and the reaction mixture stirred at room temperature for 15 minutes. The whole was then heated to 65° C. in order to insure complete reaction. Distillation of the resulting mixture gave 211.2 g. (90.8% theoretical yield) of the substantially pure 1:1 triethyl phosphite-2,3-butanedione adduct, B.P. 63–64° C./0.2 mm., $n_D^{25}$ 1.4334, which analyzed as follows:

|  | Found | Calcd. for $C_{11}H_{23}O_5P$ |
| --- | --- | --- |
| Percent C | 49.35 | 49.58 |
| Percent H | 8.59 | 8.68 |
| Percent P | 11.80 | 11.61 |

Example 12

A mixture consisting of 63.1 g. (0.3 mole) of benzil and 93.1 g. (0.3 mole) of triphenyl phosphite was heated, with stirring for 3 hours at a temperature of 100–125° C. (mostly at 110–120° C.). The resulting very viscous yellow liquid crystallized upon standing for several days. Recrystallization from hexane-benzene gave 97.0 g. (62.1% theoretical yield) of the substantially pure white 1:1 triphenyl phosphite-benzil adduct. A second recrystallization from hexane-benzene gave the purer product which analyzed as follows:

|  | Found | Calcd. for $C_{32}H_{25}O_5P$ |
| --- | --- | --- |
| Percent C | 73.60 | 73.89 |
| Percent H | 4.69 | 4.84 |
| Percent P | 6.00 | 5.76 |

Example 13

A molar excess of triethyl phosphite was gradually added to 56.8 g. of 1-phenyl-1,2-propanedione, B.P. 61–68° C./0.4–1.0 mm. The whole was then heated to 65° C. and redistilled to give, besides unreacted starting materials, the substantially pure 1:1 triethyl phosphite-1-phenyl-1,2-propanedione adduct, B.P. 122–128° C./0.5 mm., $n_D^{25}$ 1.5110, which analyzed as follows:

|  | Found | Calcd. for $C_{15}H_{23}O_5P$ |
| --- | --- | --- |
| Percent C | 56.72 | 57.27 |
| Percent H | 6.88 | 7.36 |
| Percent P | 8.89 | 9.84 |

Example 14

To 55.2 g. (0.3 mole) of phenyl ethylene phosphite there was added, at room temperature during 10 minutes, 25.8 g. (0.3 mole) of 2,3-butanedione. During the addition, the reaction temperature rose exothermally to 42° C., and at this point ice-cooling was applied. When all of the dione had been added it was stirred at room temperature, with occasional cooling, until no further evidence of exothermic reaction. It was then heated to 116° C. and distilled under partial vacuum to give 51.0 g. (63% theoretical yield) of the substantially pure 1:1 phenyl ethylene phosphite-2,3-butanedione adduct, B.P. 120–160° C. (almost completely at 151–155° C.), $n_D^{25}$ 1.5179, which analyzed as follows:

|  | Found | Calcd. for $C_{12}H_{15}O_5P$ |
| --- | --- | --- |
| Percent C | 52.87 | 53.05 |
| Percent H | 5.64 | 5.56 |
| Percent P | 11.29 | 11.39 |

Example 15

2,3-butanedione (9.7 g., 0.112 mole) was added, during about 6 minutes, to 20 g. (0.112 mole) of diethyl butylphosphonite in a nitrogen atmosphere. Addition of the dione was initiated at room temperature, but ice-cooling was applied when the temperature of the reaction mixture reached 42° C., and the remainder of the dione was added while maintaining the temperature at below 30° C. The whole was then heated to 50° C. and distilled to give 26.5 g. (89.2% theoretical yield) of the substantially pure 1:1 diethyl butylphosphonite-2,3-butanedione adduct, B.P. 62–63° C./0.15 mm., $n_D^{25}$ 1.4409, and analyzing as follows:

|  | Found | Calcd. for $C_{12}H_{25}O_4P$ |
| --- | --- | --- |
| Percent C | 54.35 | 54.49 |
| Percent H | 9.44 | 9.51 |
| Percent P | 11.55 | 11.71 |

Example 16

2,3-butanedione (17.2 g., 0.2 mole) was added, during 6 minutes, to 39.6 g. (0.2 mole) of diethyl phenylphosphonite while maintaining the temperature of the reaction mixture below 30° C. The whole was then heated to 75° C. in order to insure complete reaction and distilled to give 51.5 g. (90.7% theoretical yield) of the substantially pure 1:1 diethyl phenylphosphonite-2,3-butanedione adduct, B.P. 110–111° C./0.2 mm., $n_D^{25}$ 1.5022.

Example 17

This example shows the reaction of 2,3-butanedione with 2-ethyleneimino-1,3,2-dioxaphospholane which was prepared by reacting 2-chloro-1,3,2-dioxaphospholane with ethyleneimine.

The dione (34.4 g.) was added at room temperature, during 12 minutes, to 53.2 g. (0.4 mole) of the 2-ethyleneimino-1,3,2-dioxaphospholane. Occasional cooling was employed to keep the temperature below 35° C. The whole was then stirred with occasional cooling until no exothermic reaction was noted. Upon heating to 75° C. in order to insure complete reaction and distilling under partial vacuum, there was obtained 58.5 g. (66.7% theoretical yield) of the substantially pure 1:1 2-ethyleneimino-1,3,2-dioxaphospholane-2,3-butanedione adduct, B.P. 98–102° C./0.03–0.05 mm., analyzing 6.44% nitrogen as against 6.40%, the calculated value for $C_8H_{14}NO_4P$.

*Example 18*

This example describes the preparation of an adduct from 2,3-butanedione and the 2-ethylthiol-1,3,2-dioxaphospholane prepared by the reaction of 2-chloro-1,3,2-dioxaphospholane and ethyl mercaptan.

The dione (14.7 g., 0.171 mole) was added, dropwise during 10 minutes at 25° C., to 26 g. (0.171 mole) of the 2-ethylthiol-1,3,2-dioxaphospholane. The resulting mixture was refluxed (125–140° C.) for about 15 minutes, cooled and distilled to give 25.3 g. (62.1% theoretical yield) of the substantially pure 1:1 2-ethylthiol-1,3,2-dioxaphospholane-2,3-butanedione adduct, B.P. 104–112° C. (mostly 109–112° C.)/0.05–0.07 mm.

*Example 19*

To 139.5 g. of tris(2-ethylhexyl) phosphite there was added, during 12 minutes, 28.7 g. (0.33 mole) of 2,3-butanedione. Occasional cooling was used during the addition to maintain the temperature of the reaction mixture below 35° C. After stirring until no exothermic reaction was evidenced, the mixture was heated to 80° C. and placed under vacuum (1.5 mm. of mercury) to remove any excess of the dione. There was thus obtained as residue 161.3 g. (95.7% theoretical yield) of the substantially pure 1:1 tris(2-ethylhexyl)phosphite-2,3-butanedione adduct.

*Example 20*

To 106.1 g. (0.793 mole) of phenylglyoxal, there was added, dropwise, 67.4 g. of triethyl phosphite at a temperature between 15° C. and 30° C. After about a half of the phosphite had been added, the mixture appeared to thicken; accordingly, 50 ml. of benzene was added as a diluent. When all of the phosphite had been added, the reaction mixture was subjected to water-pump vacuum and warmed to 85° C. in order to remove the diluent and any unreacted material. The residue comprised the 1:1 triethyl phosphite-phenylglyoxal adduct.

*Example 21*

To a solution of 29.8 g. (0.1 mole) of piperil in about 100 ml. of methylene chloride, there was added 16.6 g. (0.1 mole) of triethyl phosphite during about 6 minutes. The whole was then heated at reflux for one hour. Removal of the solvent and any unreacted phosphite was effected by heating under water-pump vacuum. There was obtained as residue the 1:1 triethyl phosphite-piperil adduct, a tan viscous oil.

*Example 22*

To 54.1 g. (0.25 mole) of methyl diphenylphosphinite there was added, during 15 minutes, 21.6 g. (0.25 mole) of 2,3-butanedione. Upon adding the first few mls. of the dione, the temperature rose rapidly from 23° C. to 33° C., so that the remainder of the addition was made at 20–30° C. using an ice-bath for cooling. The whole was then stirred until no further reaction was apparent. It was then heated to 50° C., and concentrated to 75° C./0.01 mm., to obtain as residue 75.2 g. (99.4% theoretical yield) of the substantially pure 1:1 methyl diphenylphosphinite-2,3-butanedione adduct.

*Example 23*

Triethyl phosphite (5.3 g., 0.0318 mole) was added, dropwise, to 7.6 g. (0.0318 mole) of 4,4'-dimethylbenzil dissolved in a minimum of methylene dichloride. During the addition of the phosphite, the temperature of the mixture rose from 21° C. to 33° C. When all of the phosphite had been added, the whole was heated to 40° C. in order to insure complete reaction. Removal of the solvent under water-pump vacuum gave as residue the substantially pure 1:1 triethyl phosphite-4,4'-dimethylbenzil adduct.

*Example 24*

Triethyl phosphite (7.6 g., 0.0455 mole) was added, dropwise, at a temperature of 18–24° C. to a solution of 12.3 g. (0.0455 mole) of p-anisil in about 35–50 ml. of methylene dichloride. After stirring the whole until there was no evidence of an exothermic reaction, the mixture was heated to reflux in order to insure complete reaction. The solvent was removed by heating at 60° C. under water-pump vacuum and there was obtained as residue the substantially pure 1:1 triethyl phosphite-p-anisil adduct.

*Example 25*

This example describes the preparation of a 1:1 triethyl phosphite-2,3-butanedione adduct and conversion of said adduct, by oxidation, into triethyl phosphate and the parent diketone.

The 2,3-butanedione (43 g., 0.50 mole) was added, dropwise, to 83 g. (0.50 mole) of triethyl phosphite, cooled at 20–30° C. The resulting solution was warmed to 80° C. and then cooled under nitrogen to give the colorless 1:1 triethyl phosphite-2,3-butanedione adduct. Oxygen was passed into this product, which was cooled to maintain the exothermic reaction at from 20–35° C. When heat of reaction was no longer evidenced, oxygen flow was terminated, and the product was distilled to give 88.6 g. (97% theoretical yield) of triethyl phosphate and 36.8 g. of trapped yellow liquid which was shown by infra-red analysis to comprise the 2,3-butanedione.

*Example 26*

This example shows the effect of intermediately formed 1:1 dicarbonyl compound-phosphite triester adduct on the oxidation of phosphites.

A large excess (83 g., 0.50 mole) of triethyl phosphite was slowly treated with 4.3 g. (0.05 mole) of 2,3-butanedione. The temperature rose spontaneously from 25° C. to 42° C. When the temperature began to decrease, a stream of oxygen was introduced into the reaction mixture, and the temperature rose rapidly from 37° C. to 41° C. Cooling was applied for a while to keep the temperature of the reaction mixture below 35° C., but towards the end of the oxygen flow the temperature was allowed to increase to 70° C. and cooling was not used. When no further heat of reaction was evidenced, the product was distilled to give 80.2 g. of colorless liquid, B.P. 49–56° C./0.15–0.20 mm., which analyzed for triethyl phosphate as follows:

|  | Found | Calcd. for $C_6H_{15}O_4P$ |
|---|---|---|
| Percent C | 39.41 | 39.55 |
| Percent H | 8.40 | 8.3 |
| Percent P | 17.22 | 17.05 |

The 80.2 g. of triethyl phosphate corresponds to an 88% yield of the phosphate based on the quantity of triethyl phosphite. Obviously, all of this phosphite could not have initially formed a 1:1 adduct with the 2,3-butanedione; for only enough of the latter was present to consume 8.3 g. (rather than 83 g.) of the phosphite in the formation of a 1:1 adduct. Accordingly, it is believed that in the present instance the small quantity of 1:1 adduct which is formed initially is converted by oxygen into triethyl phosphate and the 2,3-butanedione as in Example 24; and that the thus-regenerated dione combines with the available unreacted triethyl phosphite to give 1:1 adduct which in turn is oxidized to triethyl phosphate and 2,3-butanedione. Continuous formation of adduct and oxidation thereof thus accounts for the high yield of phosphate. The invention thus provides a means of converting phosphites to phosphates by oxidizing the former in the presence of α-diketones as catalysts.

*Example 27*

This example shows testing of the trihexyl phosphite-2,3-butanedione adduct of Example 4 and of the tris-(chloroethyl) phosphite-benzil adduct of Example 8 against the yellow fever mosquito (*Aedes aegypti* Linne) larvae.

Culture tubes (rimless, 25 x 200 mm.) were respectively filled with 70 cc. of distilled water. To each of said tubes there was then pipetted 0.07 ml. of a 1% acetone solution of one of said adducts. This gave an 0.001% concentration of one of said adducts in each of said tubes. Each tube was rubber-stoppered and shaken vigorously to facilitate complete mixing. To each tube of the resulting test solutions there were then added 25 of said mosquito larvae. Controls were also set up by adding the same number of larvae to 70 cc. of distilled water to which had been added 0.07 ml. of acetone but no adduct. The test solutions and the controls with their larvae content were allowed to stand for 24 hours at room temperature. Observation of the tubes of larvae at the end of that time showed a 90% kill of the larvae in the tube containing the tris(2-chloroethyl) phosphite-benzil adduct, a 100% kill of the larvae in the tube containing the trihexyl phosphite-2,3-butanedione adduct and zero kill of larvae in the controls.

What we claim is:

1. The 1:1 adduct of a trivalent phosphorus compound of the formula

where R is selected from the class consisting of hydrocarbyl and halohydrocarbyl radicals which are free of acetylenic and olefinic unsaturation and have from 1 to 12 carbon atoms, Y is selected from the class consisting of R and —OR and wherein —OR and Y taken together stand for bivalent —O-alkylene-O— radical of from 2 to 5 carbon atoms, and X is selected from the class consisting of R, —OR, —SR, dialkylamino radicals having from 1 to 5 carbon atoms in each alkyl group and alkyleneimino radicals of from 2 to 5 carbon atoms, and an α-dicarbonylic compound of the formula

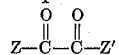

in which Z is selected from the class consisting of hydrocarbyl radicals which are free of olefinic and acetylenic unsaturation and have from 1 to 12 carbon atoms and the said hydrocarbyl radicals having a substituent selected from the class consisting of alkoxy groups of from 1 to 5 carbon atoms and the methylenedioxy,

group.

2. The 1:1 adduct of a trialkyl phosphite having from 1 to 12 carbon atoms in the alkyl radical and an α-alkanedione of from 4 to 26 carbon atoms.

3. The 1:1 adduct of a trialkyl phosphite having from 1 to 12 carbon atoms and an aryl-substituted α-alkanedione having from 10 to 26 carbon atoms.

4. The 1:1 adduct of benzil and a trialkyl phosphite having from 1 to 12 carbon atoms in the alkyl radical.

5. The 1:1 adduct of an S-alkyl dialkylphosphorothioite and an α-alkanedione of from 4 to 26 carbon atoms.

6. The 1:1 adduct of trimethyl phosphite and 2,3-butanedione.

7. The 1:1 adduct of tris(2-chloroethyl) phosphite and 2,3-butanedione.

8. The 1:1 adduct of triphenyl phosphite and 2,3-butanedione.

9. The 1:1 adduct of triethyl phosphite and 1-phenyl-1,2-propanedione.

10. The 1:1 adduct of phenyl ethylene phosphite and 2,3-butanedione.

11. The method which comprises contacting a trivalent phosphorus compound of the formula

where R is selected from the class consisting of hydrocarbyl and halohydrocarbyl radicals which are free of acetylenic and olefinic unsaturation and have from 1 to 12 carbon atoms, Y is selected from the class consisting of R and —OR and wherein —OR and Y taken together stand for bivalent —O-alkylene-O— radical of from 2 to 5 carbon atoms, and X is selected from the class consisting of R, —OR, —SR, dialkylamino radicals having from 1 to 5 carbon atoms in each alkyl group and alkyleneimino radicals of from 2 to 5 carbon atoms, with an α-dicarbonylic compound of the formula

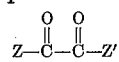

in which Z is selected from the class consisting of hydrocarbyl radicals which are free of olefinic and acetylenic unsaturation and have from 1 to 12 carbon atoms and the said hydrocarbyl radicals having a substituent selected from the class consisting of alkoxy groups of from 1 to 5 carbon atoms and the methylenedioxy, —O—CH$_2$—O—, group, and recovering from the resulting reaction product an adduct in which one mole of the phosphorus compound is combined with one mole of the dione.

12. The method which comprises contacting a trialkyl phosphite having from 1 to 12 carbon atoms in the alkyl radical with an aryl-substituted α-alkanedione having from 10 to 26 carbon atoms and recovering from the resulting reaction product an adduct in which one mole of the phosphite is combined with one mole of the dione.

13. The method which comprises contacting trimethyl phosphite with 2,3-butanedione and recovering from the resulting reaction product an adduct in which one mole of the phosphite is combined with one mole of the dione.

14. The method which comprises contacting trimethyl phosphorothioite with 2,3-butanedione and recovering from the resulting reaction product an adduct in which one mole of the phosphorothioite is combined with one mole of the dione.

15. The process which comprises contacting the adduct defined in claim 1 with an oxygen-containing gas and recovering from the resulting reaction product the α-dicarbonylic compound defined in claim 1 and an ester of the formula

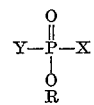

wherein Y, R and X are as defined in claim 1.

16. The process which comprises passing oxygen into the 1:1 adduct of triethyl phosphite and 2,3-butanedione and recovering triethyl phosphate and 2,3-butanedione from the resulting reaction product.

17. The process of oxidizing a phosphite to a phosphate which comprises mixing the phosphite with an α-diketone and passing an oxygen-containing gas into said mixture.

18. The process of converting a phosphite to a phosphate which comprises passing an oxygen-containing gas into the phosphite in the presence of an α-diketone as catalyst.

19. The process which comprises passing oxygen into triethyl phosphite in the presence of a catalytic quantity of 2,3-butanedione and recovering triethyl phosphate from the resulting reaction product.

References Cited in the file of this patent

Kosolapoff: "Organo-Phosphorus Compounds," John Wiley & Sons, Inc., New York (1950), page 231.

UNITED STATES PATENT OFFICE
CERTIFICATION OF CORRECTION

November 22, 1960

Patent No. 2,961,455

Gail H. Birum et al.

It is hereby certified that error appears in the above numbered patent requiring correction and that the said Letters Patent should read as corrected below.

Column 2, line 6, in the formula, for "Z", second occurrence, read -- Z' --; line 13, for "group." read -- group, and Z' is selected from the class consisting of Z and hydrogen. --; line 15, in the formula for "Z" read -- Z' --; column 6, line 17, for "atoms." read -- atoms, and Z' is selected from the class consisting of Z and hydrogen. --; column 13, line 55, for "group." read -- group, and Z' is selected from the class consisting of Z and hydrogen. --; column 14, line 26, after "group," insert -- and Z' is selected from the class consisting of Z and hydrogen --.

Signed and sealed this 11th day of July 1961.

(SEAL)
Attest:
ERNEST W. SWIDER
Attesting Officer

DAVID L. LADD
Commissioner of Patents

UNITED STATES PATENT OFFICE
CERTIFICATE OF CORRECTION

Patent No. 2,961,455                  November 22, 1960

Gail H. Birum et al.

It is hereby certified that error appears in the above numbered patent requiring correction and that the said Letters Patent should read as corrected below.

Column 9, line 29, beginning with "Example 11", strike out all to and including the table in line 49, same column 9.

Signed and sealed this 24th day of April 1962.

(SEAL)
Attest:

ESTON G. JOHNSON
Attesting Officer

DAVID L. LADD
Commissioner of Patents